Nov. 16, 1926.

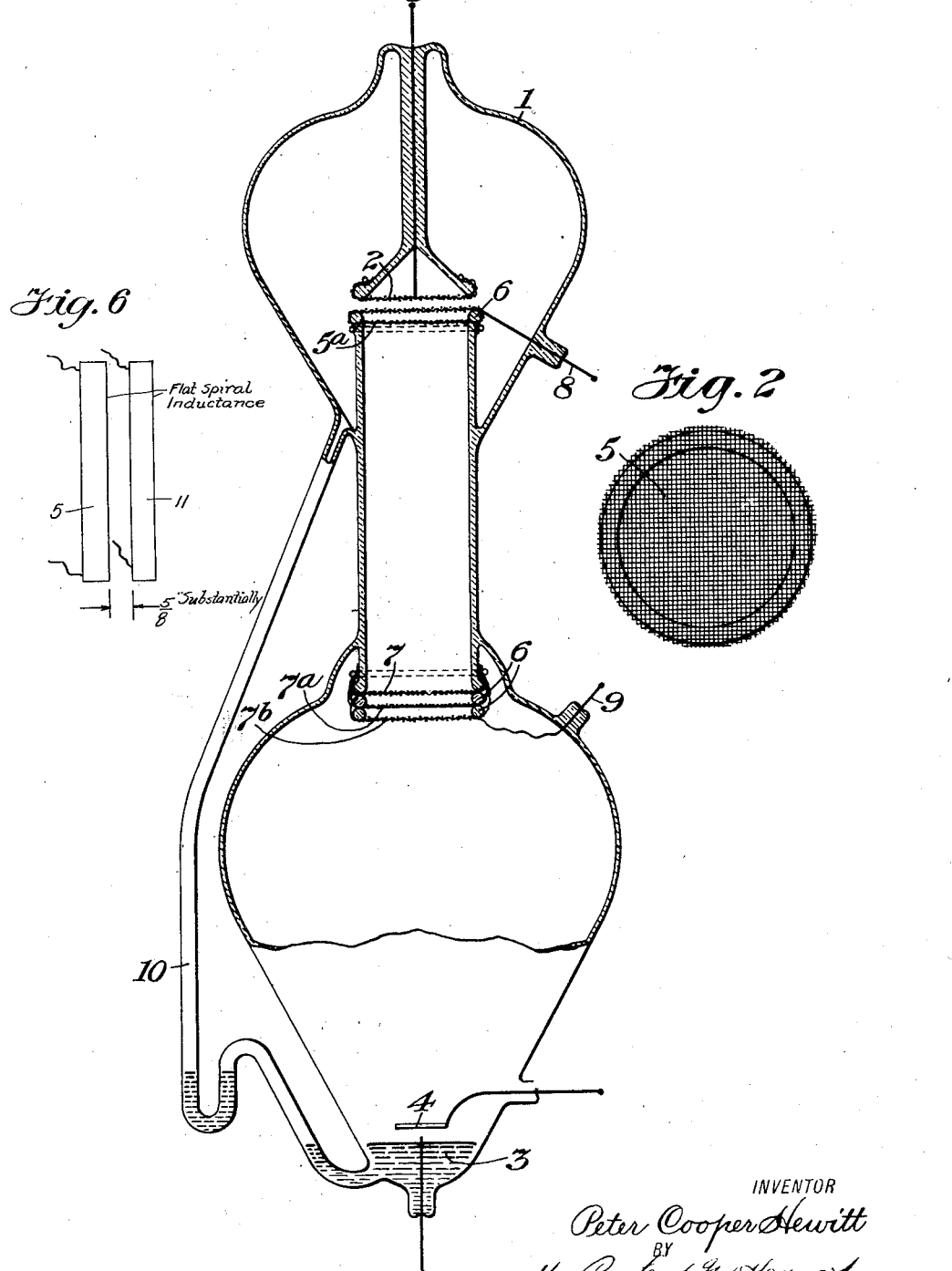

P. C. HEWITT 1,607,278

SYSTEM OF ELECTRICAL DISTRIBUTION

Original Filed April 23, 1921    3 Sheets-Sheet 2

INVENTOR
Peter Cooper Hewitt
BY
Kerr Page Cooper & Hayward
HIS ATTORNEYS

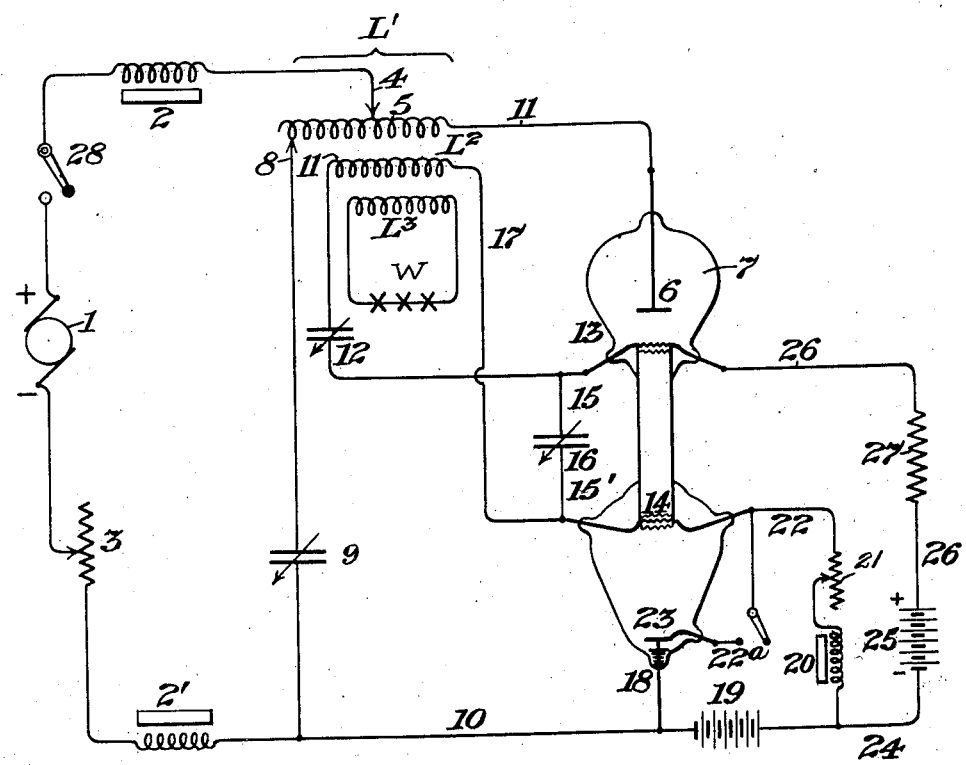

Patented Nov. 16, 1926.

1,607,278

UNITED STATES PATENT OFFICE.

PETER COOPER HEWITT, OF RINGWOOD MANOR, NEW JERSEY; THE FARMERS' LOAN AND TRUST COMPANY, EXECUTOR OF SAID PETER COOPER HEWITT, DECEASED, ASSIGNOR TO COOPER HEWITT ELECTRIC COMPANY, OF HOBOKEN, NEW JERSEY, A CORPORATION OF NEW JERSEY.

SYSTEM OF ELECTRICAL DISTRIBUTION.

Application filed April 23, 1921, Serial No. 464,046. Renewed July 31, 1926.

The present invention relates to improvements in electrical devices wherein current is caused to flow in a circuit consisting of a true conductor and from one electrode to another through a space having conductivity of a different character and wherein such space is comprised in the device and the said current flow is affected for useful purposes at one or the other of said electrodes, or at both electrodes, or at a point or points between the electrodes, or at an electrode and a point between the electrodes, or at both electrodes and a point between the electrodes. The invention is useful in connection with devices containing rarefied gas or vapor and also having the highest exhaustion and with devices having no ionization, and particularly useful with devices of lower exhaustion and devices having ionization.

The object of my invention is to control the reaction attendant upon current flow at or between electrodes of an electric circuit for various useful purposes and to this end I provide a shield of foraminous material or a number of such shields in operative relation to an electrode or the electrodes, or to a point or points between the electrodes for affecting the said reactions.

A control electrode in the form of a perforate body, such as a screen or shield of foraminous material, is useful for the purposes for which shields are used in evacuated rectifying devices and in evacuated devices for producing varying currents from direct or alternating currents, and for purposes where it is desired to increase the voltage required to pass current through the device, and thereafter to decrease it, and is generally useful for the control and variation of the voltage required to pass a given current through the device and of the control of the electrical discharge conditions within the device for any purpose; and for stopping current flow; and for performing the function of a switch; and useful for high voltages.

The discharge conditions of an electrode and reactions at and associated with an electrode, and also the conditions of conduction existing in the space between two electrodes may be modified by charges independently created and currents independently applied to the space between the electrodes in the same or opposite direction to that of the main current flow.

In many cases when reactions in the space between two electrodes are modified so that the voltage required to pass equal current is increased, the current tends to concentrate and limit the area of the path of its flow so that when the reactions are to be modified, as by a screen or perforate plate interposed in the electric path between two electrodes and also by a screen through which the current would pass normally, when such screen is charged negatively, the current will tend to concentrate and pass at a single spot instead of diffusing normally through a large area of the screen forming a shield located in the current path.

When the concentration of the current, that is, when the current restricts its area and passes through a shield or screen in such limited area, the reactions which govern its passage are not so easily nor to the same extent controllable by charges applied as when the current is diffused over the normal area.

It is often useful to modify the reactions within a device for special purposes and particularly to increase the voltage required to pass current to such a degree as to prevent current passing. This increase of voltage may be availed of as and in the manner of falling electromotive force as well as increasing electromotive force.

The object of my invention is to provide means whereby the reactions may be controlled and a shield or shields be used for controlling these reactions by charges applied through them without such concentration of current as to impair the action, and to provide means whereby the action may be powerfully exerted.

I have discovered that where the substance of the shield is small compared to the area of the opening, that concentration does not take place with the same degree of electrical force applied; that is, in the case of a wire screen, as the size of the wire is decreased, the electrical force applied to the shield may be increased without promoting objectionable current concentration, and that diffused current may be caused to pass through one or more shields or screens located a small distance apart without concentration when the material in them is sufficiently fine.

I have also found that there is less tendency toward concentration of current when the shield is located in close proximity to the positive electrode, and that the discharge conditions of an evacuated device containing vapor of considerable density may be controlled within wide limits by means of a shield located in close proximity to the positive electrode.

The current has a tendency to diffuse over a certain area of a positive electrode even in vapors or gases of considerable density and there is a reaction in very close proximity to the surface of the positive electrode which is sensitive to electrical charges and also sensitive to the mesh of a shield in close proximity to the positive. Such a shield tends to increase the voltage required to pass current through the device and this condition may be increased by the fineness and multiplicity of the openings in the shield. The natural increase brought about by the shield may be modified, and when the shield is made positive to the negative to a lesser degree than the positive electrode is positive to the negative, the voltage required to pass current from the positive to the negative electrodes is lessened. The voltage is increased by the shields having a charge negative in some degree to the positive and increases as the shield is made more negative. It is decreased by the shields being positively charged from the negative; that is, when provided with a separate source of current and said source having a separate circuit to the negative. Additional controls may be provided by a plurality of shields or screens of very fine wire located in the path between two electrodes.

The wire for the shields or screens is preferably made of a high melting point material such as tungsten carbon or tantalum where powerful action is required, although lower melting point materials are serviceable, and those located in the vapor path between the electrodes may be as fine wire as is practically usable. The size of the mesh will probably be less than twenty to the inch, and with very fine wire may be less than one hundred to the inch. A practical screen may be made of wire, the material of which occupies substantially a relation of ten percent of the mesh; that is, the solid material covers about ten percent of the area and forms a depth of about ten percent of the opening. The screen at the positive will be substantially the same, but may not require the wire to be as fine.

The current has a tendency to diffuse over the surface of the positive, and this tendency assists diffusion through the shield when the shield is in close proximity to positive. Moreover, there are reactions at and near the surface of the positive that makes it desirable to locate the shield close to the positive, when availing of these reactions and using them as means for or assisting control of the discharge or conduction condition of the device.

The shield, screen or control electrode is composed of wire gauze, the wire forming substantially ten percent of the mesh which is substantially the relation promoting diffusion and I have found that non-concentration of the current can be obtained when this relation of the solid material to the open space is secured. When the wire is too large in diameter or forms too great a percent of the mesh, the current will tend to concentrate and pass through one and sometimes two or more meshes in concentrated form and the operation or control of the shields is modified and lessened very materially, and internal disturbances, electrical variation and resistance variation are produced.

In order to provide additional control with such a shield, it may be duplicated, or a multiplicity of them used, and they operate well at a distance apart substantially that of the mesh or greater distance, and greater separation may be used.

In the present invention the current path through a shield is very short in comparison to the distance from one side of the shield to the other, and the current does not concentrate and is not acted on by these shields in a concentrated state, but in a state of diffusion or by the boundaries of a number of openings. In the present case the unit surface acting on the current at right angles to its path is large. The current path is not acted on by any one gauze or screen forming the shield for a considerable distance parallel with and along the path of the current.

For the control of the current path one, two or more independent shields or control electrodes may be provided at different distances spaced along the path between the electrodes, and may consist of a multiplicity of parallel screens.

The solid material forming the shield or screen may be made of wire as fine as .0003 inches or less, and may be made of coarse wire or other material by observing the rule substantially relative to the spacing and depth of the openings.

An effective control is provided by two shields or control electrodes spaced along the path, one of which is in close proximity to the positive electrode, in a special form of device, having a gas or vapor pressure of considerable density, used as an electrical generator of high frequency currents from direct or alternating currents, by which frequencies are obtained equal and comparable to those obtained in devices having the lowest gas or vapor pressure of the order of the highest vacuum now obtainable, and a mercury vapor device having a glass container operating at comparatively high temperature, becomes serviceable for the generation of currents of a wave length of two hundred and fifty metres or less, as well as longer wave lengths.

When the apparatus contains gases or vapors of considerable density, the internal temperature at the shields of the device is apt to be high when operating with currents of several kilowatts. It is therefore advantageous to use for the material forming the shield providing a control electrode or shield, a wire having a high melting point, and it is also advantageous that such material does not tend to exfoliate or fire off when in operation. High melting point materials are tungsten, tantalum, molybdenum, chromium, iridium, platinum and carbon. Carbon, at a very high temperature, does not tend to act as a prohibitive negative as well as tungsten, although at lower temperature carbon has many valuable characteristics and is useful. At certain degrees of high vacuum certain materials may act as substantially prohibitive negatives, that is will not act as a negative electrode to pass current, but in most cases, and especially at lower vacuums when exposed in a current carrying media, they will pass more or less when acting as a negative electrode current with a very definite fixed current maximum. For certain classes of apparatus it is desirable that they should pass as little negative current as possible to obtain in order to enable the control of the apparatus with minimum control current; that is, obtain a negative charge at the shield with minimum current passing by obtaining a fixed maximum that is small. Therefore the selection of material becomes a matter of a certain degree of importance for special apparatus, and will vary for special uses.

The gauzes are useful in various types of devices, for example, where one electrode is composed of mercury or other volatile material and operated at a considerable temperature, or where a solid material, such as tungsten, tantalum, platinum or carbon is employed, or where or whether another material is employed. In the choice of materials, the chemical relation of the materials used are important as chemical reactions modify and impair the action and may shorten the life of the device. The physical reactions under the action of the current are also important in this connection.

This form of shield with devices of the highest exhaustion may be used to eliminate internally originated disturbances often occurring in such devices when forced, and therefore shields of this character are of great value for affecting the control of devices for modulation and control of passing current for uniform effect, as more pronounced effects can be produced without producing the attendant internal disturbances created that usually arise at or near the limit of practical operation of devices used for this purpose.

By way of example, I have illustrated my invention in the accompanying drawings as applied to a gas or a vapor electric tube, but it will be understood that the invention is applicable to any form of tube wherein a vapor or a gas is present or is absent or does not play a part in the process of conduction therein.

Referring to the drawings, Figure 1 is a view of a vacuum tube to which my novel form and arrangement of control devices is applied;

Fig. 2 is a plan view of the foraminous material employed as a control member;

Fig. 5 is a diagram of a novel system of circuits and apparatus for producing varying and alternating currents from a direct current source.

Fig. 6 is a diagrammatic representation of the flat inductances of the device of Fig. 5 showing the alignment thereof in parallel planes and at a distance of substantially five-eighths of an inch apart.

Figure 3:
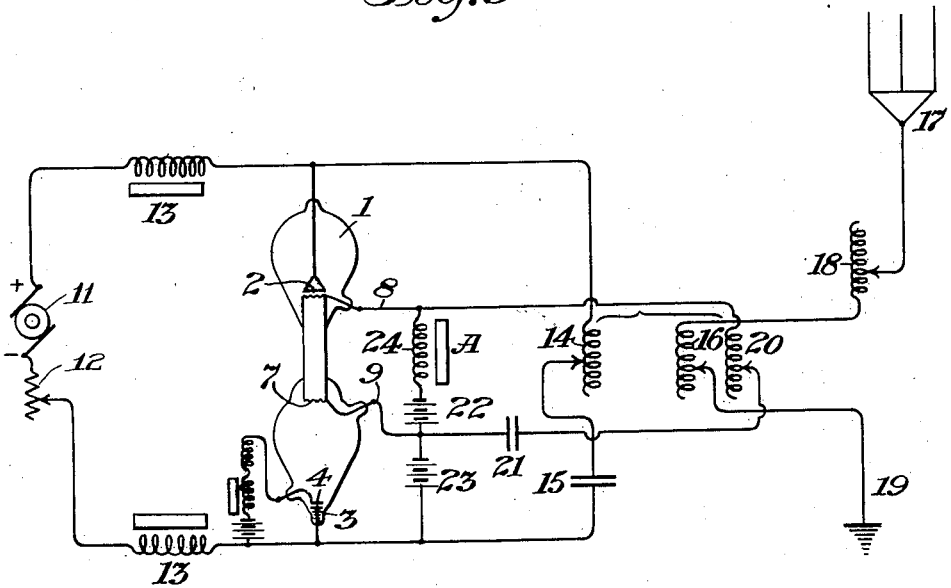
Fig. 3 is a diagram of a novel system of circuits and apparatus for producing high frequency currents as used in radio signalling.

In the drawings, Fig. 1, 1 is a tube having a positive electrode, 2, and a negative electrode, 3, here shown as mercury being of volatile material, and having a suitable keep-alive circuit conventionally indicated at 4, although a solid material, such as incandescent tungsten and keep-alive or beating circuit may be employed, when desired. In practice, the current flow between the electrodes is obtained by connecting the electrodes 2 and 3 to a suitable source of current (not shown). In the path of the current flow and between the electrodes I mount a shield consisting of wire gauze, 5, or two or more wire gauzes, 5 and 5$^a$, if desired, supported by the container, the screens, when a plurality of them form the shield, being separated the required distance by rings of suitable material such as glass, 6, ground flat.

I have also found it advantageous to mount another shield, 7, which may consist of a plurality of parts, 7$^a$, 7$^b$, at a point in the current path remote from the shield 5, to assist in the control action of the discharge conditions of the device.

When it is desired to control the current flow through the device, an electrical connection from the screen 5, or the screens 5 and 5ª, to a suitable source of control, is provided by a lead wire 8; and by a lead-wire, 9, when the screen 7, or the screens 7, 7ª and 7ᵇ are used. A trap drain is shown at 10 for returning products of condensation from the positive chamber to the cathode, when a condensible gas, such as mercury, is used as the negative electrode.

In Fig. 3, the tube 1 of Fig. 1 is shown as employed in a radio signalling system and connected to a current supply circuit consisting of a source of current either direct or alternating current, 11, resistance, 12, and inductance 13, 13. The tube 1 is shunted by a circuit containing inductance 14, and capacity here shown as condenser 15. In inductive relation to the inductance 14 is an inductance 16 in an antenna comprising aerial, 17, tuning inductance, 18, and ground wire, 19.

The control apparatus for the outfit above described comprises an inductance, 20, inductively related to the inductances 14 and 16, and connected to the leads 8 and 9 of the screen devices 6 and 7, respectively, through a condenser, 21, and causing the oscillations generated in the inductance 16 to react upon the conducting path of the tube 1. The screens, shields, or control electrodes 6 and 7 are maintained at proper potentials by the batteries 22 and 23, respectively, the potentials of the batteries contributing as means of control. An impedance device, 24, is connected across the leads 8 and 9 and in series with the battery 22, to exclude high frequency currents from this path.

Figure 4:
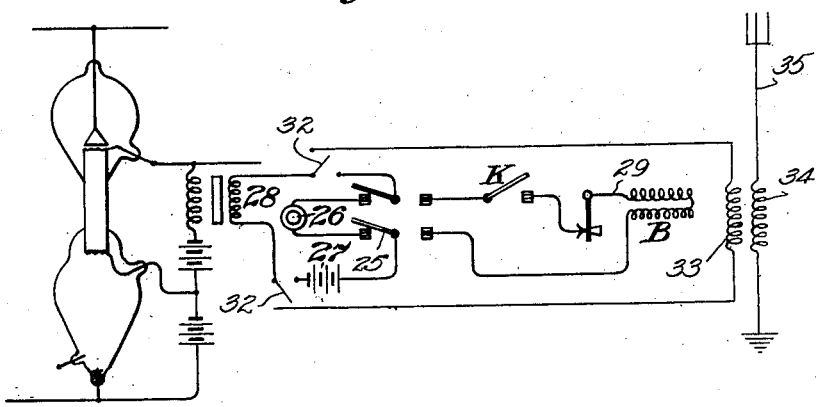
Fig. 4 is a diagram of a microphone and a key circuit applied to the system of Fig. 3 for transmitting speech or telegraph signals.

When the outfit is started into operation in a manner now well understood in the art, by closing the current supply, the oscillations created by current passed by the device in the antenna are caused to react through the coil 20 and its circuit through the control electrodes 6 and 7 on the current path of the tube 1, controlling the current passed by the tube 1. To vary the operation for radio telephony, a switch, 25, (Fig. 4) is thrown to the left connecting a microphone, 26, in circuit with a battery, 27, and a coil, 28, inductively related to coil 24. Throwing the switch, 25, to the right cuts the microphone out of circuit and connects a key and buzzer conventionally shown at 29 into the sending circuit for radio telegraphy.

The microphone may be replaced by other control means for example, by throwing switches 32, 32 across the terminals of the secondary 33 of an induction coil having its primary 34 in the receiving circuit 35 for the purpose of causing a station to relay receiving signals to another station.

Referring to Fig. 5, the tube 7 utilized for purposes of illustration in connection with the novel operating system shown in that figure is the tube of my application Ser. No. 397,965, filed July 21, 1920, of which this application is a continuation, in part, and is characterized by being provided with shields or screens used as control terminals promoting current diffusion. The tube 7 consists of two bulbs, an upper one and a lower one, joined together by an intermediate tube of smaller diameter. The main positive electrode 6 contained by the upper bulb is a flat disk of carbon supported at approximately the middle of the bulb. The shield 13 next to it consists of two circular disks of wire gauze formed of wire and mesh being separated approximately one-eighth of an inch and joined together electrically. There are two forms of supporting shield, both of which are here illustrated, 13 being form A and 14 being form B.

The shield 14 at the lower end of the tube consists of three wire gauzes, separated severally by one-eighth of an inch and joined together electrically. The negative terminal 18 of the tube consists of mercury with a point projecting therefrom and adjacent to that about one-quarter inch from its surface is a keep alive positive electrode 23.

The system for operating the device of Fig. 5 for creating alternating currents from a direct current source is composed as follows:

1 is a direct current generator having a capacity of 1200 volts and an output of .6 of an ampere. The leads from the generator 1 extend through inductance coil 2 and 2' and a variable resistance 3 is provided to be used when desired. The positive line 4 from the generator leads to an inductance coil 5 consisting of 78 turns having a mean diameter of 18 inches. The lead 4 has a variable contact on inductance 5 for varying the inductive values of the line and contacts with the inductance in an intermediate point of inductance 5, one end of which extends to the positive terminal 6 of the tube 7. The other end of inductance coil 5 has a variable connection 8 which extends through a variable capacity 9 connected to the negative lead 10 of the generator 1. Separated from inductance 5 is an additional inductance 11 which consists of 78 turns of a mean average diameter of 18 inches. This inductance 11 has a fixed value, but may be made variable for purposes of convenient adjustment. Inductance 11 is wound in the reverse sense from inductance 5; that is to say, one being right and the other being left. One end of inductance 11, that is the end adjacent to terminal 8 of inductance 5, leads to variable condenser 12 and thence to positive potential shield of terminal 13, the other end adjacent to the terminal of inductance 5 leading to the tube terminal 6 is connected directly to the lower shield or potential terminal 14. The terminals of this inductance circuit leading to the tube are connected by means of a lead 15 to variable condenser 16 and line 15'. Work circuit inductance 17 consists of seven turns 16 inches in mean diameter and the terminals of this inductance lead directly to work circuit W consisting of a resistance of 18 ohms. The negative terminal 18 of the tube is connected to the main line 10 from the generator 1, and there is also connected to the negative terminal a storage battery 19 of 45 volts, the positive line from which passes through an inductance 20 having an iron core, a resistance 21, and by means of the line 22 is connected to the keep-alive terminal 23. A switch is included in this line for discontinuing this connection when the device is in operation, if desired. Line 22 is also connected to shield 14. From the battery 19 line 24 extends to a battery 25 of 20 volts and the line connection 26 from it goes to a resistance 27 of 10,000 ohms which in turn through line 26 is connected to the upper or positive shield 13. The maximum value of variable condenser 12 is .0005 and during operation about one-fifth of this value was in service. The maximum value of variable condenser 16 was .002 and was operated at approximately one-fourth of this value. The value of variable condenser 9 was .0017 and was operated from its full value to .0003.

Before closing switch 28 the device is started into operation by current passing from battery 19 through line 22 to keep-alive terminal 23, contact having been made by shaking the device and causing the mercury of negative 18 to contact with 23. The switch in line 22ª being opened current flows from the shield 14 to negative 18 and also a small current flows by means of batteries 19 and 25 and line 26 from the shield 13 to negative terminal 18.

On closing switch 28 varying current passes from positive 6 through the device to a negative terminal 18 generating high frequency currents in the work circuit W. In this particular instance the frequency in the work circuit is that of a wave length of 1800 meters. The current in the main line was .45 of an ampere, and the current in the work circuit was 3½ amperes. The current consumption of the device is varied by varying the capacity of the condenser 9. The smaller the condenser the greater the current consumption of the device, and the greater the current in the work circuit or the larger the condenser 9 the smaller the current consumed by the device and also the greater the voltage drop over the device, or, in other words, on increasing the capacity of condenser 9, the voltage drop over the tube is increased. In this particular arrangement inductance 5 is a flat spiral in form and is separated from inductance 11, which is also a flat spiral in form, by substantially five-eighths of an inch. The relation of these inductances to each other bears a very distinct relation to the operation of the tube, especially at high frequency, and it appears that the capacity between them at high frequencies exercises a very important function, the frequency being determined in a large measure by the inductance values of these inductances through inductive relation and the capacity between them modified by the inductive relation of the work circuit to them and the resistance of the work circuit; the whole forming a most complex electrical situation further complicated by the time period relations of the various circuits and inter-relating circuits associated with them. Having established a circuit of this character having a known frequency and output as well as current consumption in a circuit, circuits of other frequencies and other power relations may be constructed for the purposes desired.

I have given a definite concrete example from which other circuits desired may be worked out and constructed and will not attempt to define the interaction of all the various parts of this circuit.

The time period and power value of the tube and circuit may be considered to be determined chiefly by the electrical characteristics and relations of inductance 5, inductance 11, the capacity between them, and the characteristics of the tube. On decrease of inductance value of these coils, the time period will become less and in the same manner increasing the inductance value the time period will become greater, bearing in mind in making changes the subtle capacity relation between them. The control circuits provide means for the operation and regulation of the circuits as a whole and are means for modifying and adjusting the circuits but not the fundamental control of the operation as exercised by the electrical relation of inductance 5 to inductance 11 modified by the system and in connection with the tube characteristics.

A tube of this character may be made useful for very high voltages and may be made for lower voltages and is useful for large currents. In case of large currents being used, special cooling means may be provided and the tube may be constructed of metal with the present shield modification. The device may be operated from a pilot source of potential as a generator of alternating current being applied from a direct current source or a source of lower frequency alternating currents being useful on very high voltages as well as currents of large quantity. It may be used as a vacuum generator of alternating currents of any frequency.

The technical self operation of the tube and system is believed to be more understandingly explained to those skilled in the art by means of a concrete example than by theoretical considerations of the circuits.

A device comprising a shield at the positive of the character described may be used as a switch and in case of very high voltage currents a multiplicity of gauzes in parallel may be used for the shield at the positive terminal. If contact be made by means of a separate circuit from negative electrode 18 to the positive shield electrode 13, current will cease to flow through the device, and the current flow in the circuit is stopped.

Under the conditions recited, the carbon positive electrode had the dark appearance of a cool body and was not red hot when the adjustments of the various parts were correlated. With bad adjustment, the positive electrode becomes a dull red which with adjustment of the various circuits immediately reassumes the dark appearance of a cool body. Under this condition the internal losses in the tube probably approach a minimum attainable in such a device.

What I claim is:

1. In a system of electrical distribution, the combination of a sealed tube having a positive electrode and a negative electrode comprising vaporizable material therein and a control terminal therein in close proximity to the positive electrode, a source of direct current connected to said electrodes, and means for fixing the time period of operation of the tube consisting of an inductance coil in series with one of said electrodes, and an inductance coil in inductive relation to the series inductance coil and connected to the control terminal of the tube at the positive electrode.

2. In a system of electrical distribution, the combination of a sealed tube having a positive electrode and a negative electrode comprising vaporizable material therein and a control terminal therein in close proximity to the positive electrode, a source of direct current connected to said electrodes, and means for controlling the conductivity of the tube consisting of an inductance coil in series with the tube one end of the inductance being connected to the positive electrode and the other end thereof being connected through a condenser to the negative electrode lead, and an inductance coil in inductive relation to the series inductance coil and connected to a control terminal in said tube.

3. In a system of electrical distribution, the combination of a sealed tube having a positive and a negative electrode comprising vaporizable material therein and control terminals therein, a source of direct current connected to said electrodes, an inductance coil in series with said tube, an inductance coil in inductive relation to the series inductance and connected to the control terminal of the tube for controlling the conductivity of the tube and a work circuit inductance coil in inductive relation to said series inductance for transforming the varying current of the series inductance into alternating current.

4. In a system of electrical distribution, the combination of a sealed tube having a positive and a negative electrode therein and control terminals therein, a source of direct current connected to said electrodes, a flat spiral coil in the line to one of said electrodes, a flat spiral coil in inductive relation to the line inductance and connected to the control terminals of the tube for controlling the conductivity of the tube.

5. In an apparatus for producing alternating currents, the combination of a source of current supply, a device connected thereto and comprising an exhausted container having a positive electrode and a negative electrode comprising vaporizable material therein, a plurality of shields of wire gauze in close proximity to each other and one of which is in close proximity to the positive electrode, means for applying a definite potential to the shields, means for applying variations of potential to the shields, means for varying the definite potential, and an output circuit electrically connected with the device, and an alternating current energy consuming means associated with the said output circuit.

6. In an apparatus for producing alternating currents, the combination of a source of current supply, a device connected thereto and comprising an exhausted container having a positive electrode and a negative electrode comprising vaporizable material therein, a plurality of foraminated conductive shields in close proximity to each other and one of which is in close proximity to the positive electrode, means for impressing different potentials on the different shields, means for applying variations of potential to the shields, an output circuit electrically connected with the device, and an alternating current energy consuming means associated with the said output circuit.

7. In an apparatus for producing alternating currents, the combination of a source of current supply, a device connected thereto and comprising an exhausted container having a positive electrode and a negative electrode comprising vaporizable material therein, a plurality of foraminated conductive shields in close proximity to each other and one of which is in close proximity to the positive electrode, means for impressing difference of potential between the shields, means for applying variations of potential to the shields, an output circuit electrically connected with the device, and an alternating current energy consuming means associated with the said output circuit.

8. In an apparatus for producing alternating currents, the combination of a source of current supply, a device connected thereto and comprising an exhausted container having a positive electrode and a negative electrode capable of emitting electrons therein, a plurality of foraminated conductive shields in close proximity to each other and one of which is in close proximity to the positive electrode means for impressing difference of potential between the shields, means for applying variations of potential to the shield, an output circuit electrically connected with the device, and an alternating current energy consuming means associated with the said output circuit.

9. In an apparatus for producing alternating currents, the combination of a source of current supply, a device connected thereto and comprising an exhausted container having a positive electrode and an electron emissive negative electrode therein, a plurality of foraminated conductive shields in close proximity to each other and one of which is in close proximity to the positive electrode, direct current source connected across said shields, means for applying variations of potential to the shields, an output circuit electrically connected with the device, and an alternating current energy consuming means associated with the said output circuit.

10. In an apparatus for producing alternating currents, the combination of a source of current supply, a device connected thereto and comprising an exhausted container having a positive electrode and an electron emissive negative electrode therein, a plurality of foraminated conductive shields in close proximity to each other and one of which is in close proximity to the positive electrode, direct current source connected across said shields, means for applying variations of potential to the shields, means for varying the potential of said direct current source, an output circuit electrically connected with the device, and an alternating current energy consuming means associated with the said output circuit.

In testimony whereof I hereto affix my signature.

PETER COOPER HEWITT.